United States Patent [19]

Potts et al.

[11] 4,079,172

[45] Mar. 14, 1978

[54] GALVANIC CELL HAVING A HIGH PRESSURE VENT CLOSURE

[75] Inventors: Thomas Renwick Potts, Greenville; Norris Holland Drum, Winterville, both of N.C.

[73] Assignee: Union Carbide Corporation, New York, N.Y.

[21] Appl. No.: 782,401

[22] Filed: Mar. 30, 1977

[51] Int. Cl.² .......................................... H01M 2/12
[52] U.S. Cl. ........................................ 429/54; 429/82; 429/173; 429/185
[58] Field of Search ................ 429/54, 171, 172, 173, 429/82, 185, 174

[56] References Cited

U.S. PATENT DOCUMENTS

| | | | |
|---|---|---|---|
| 1,941,725 | 1/1934 | Tyzzer | 429/185 |
| 3,068,313 | 12/1962 | Daley | 429/174 |
| 3,237,060 | 2/1966 | Ross | 429/185 |
| 3,398,026 | 8/1968 | Andre | 429/54 |
| 3,802,923 | 4/1974 | Spanur | 429/173 |

Primary Examiner—John H. Mack
Assistant Examiner—H. A. Feeley
Attorney, Agent, or Firm—Cornelius F. O'Brien

[57] ABSTRACT

Sealed galvanic dry cells having at least one gas venting passage disposed at the interface of the top surface of the cover and the curled over rim of the container. The passage is defined as being a recess in the cover disposed below the curled over rim and/or a notch in a portion of the curled over rim.

15 Claims, 11 Drawing Figures

GALVANIC CELL HAVING A HIGH PRESSURE VENT CLOSURE

FIELD OF THE INVENTION

This invention relates to sealed galvanic dry cells, and more particularly to a high pressure venting means for releasing high excessive gas pressure from inside the dry cells.

BACKGROUND OF THE INVENTION

Galvanic cells may generate large quantities of gas under certain conditions during use. Since these cells are required to be tightly sealed at all times in order to prevent loss of electrolyte by leakage, high internal gas pressures may develop. Such pressures may cause leakage, bulging or possible explosion of the cell if not properly vented. If a vent valve is employed, it generally is resealable in order to avoid drying out of the electrolyte over the life of the cell and to prevent ingress of oxygen from the atmosphere which can cause wasteful corrosion of the anode.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

Another type of resealable pressure relief vent valve that has been tried is that disclosed and claimed in U.S. Pat. No. 3,293,081 issued to J. L. S. Daley on Dec. 20, 1966. This resealable vent valve basically includes an annular seal gasket, such as an O-ring, which is maintained in sealing position around the periphery of the vent orifice by means of an arc shaped resilient member or spring. The resilient member or spring is designed to yield and permit radial movement of the seal gasket so as to momentarily break the seal and allow the passage of gas through the vent orifice when a predetermined high internal gas pressure is reached inside the cell.

Another type of resealable vent is disclosed in U.S. Pat. No. 3,415,690 to Richman issued on Dec. 10, 1968. In this vent, a flat elastomeric seal gasket overlies the vent opening and is retained in place by a resilient terminal cap on the top of the cell. This vent operates in basically the same manner as the vents previously described.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the buildup of a predetermined high internal gas pressure inside the container so as to momemtarily break the seal and allow gas to escape through the vent orifice.

A major problem encountered with resealable pressure relief vent valves of the types just described is that they are bulky and/or difficult to incorporate into the cell assembly. Furthermore, these pressure relief vent valves are expensive to manufacture and most are not adaptable for incorporation into miniature size cells. In addition, some of the prior art resealable vents as exemplified by the foregoing patents are not suitable for low pressure venting.

An inexpensive low pressure resealable vent closure is disclosed in U.S. application Ser. No. 671,674 filed in the name of Henry Heinz, Jr. on Mar. 29, 1976. Specifically, a galvanic cell is disclosed having a resealable vent closure consisting of a resilient elastomeric sponge gasket disposed and compressed between the cover of the cell and the upper wall of the cell's container and designed to vent low pressure gas buildup along the cover-gasket interface and/or container-gasket interface.

As discussed above, resealable, high pressure relief vent valves are generally bulky and/or difficult to incorporate into a cell assembly while low pressure vent means for some cell systems may not adequately and sufficiently prevent loss of electrolyte through leakage or prevent ingress of oxygen from the atmosphere which could cause wasteful corrosion of the anode.

It is, therefore, an important object of this invention to provide a compact and economical high pressure vent for use in a galvanic dry cell.

Still another object of this invention is to provide a high pressure vent for galvanic dry cells which requires the very minimum number of parts and which is, therefore, easy to assemble and inexpensive to manufacture.

Another object of this invention is directed to a galvanic cell in which the upper wall of the container which is turned over the cover has a notch to facilitate the venting of high pressure gases from within the cell.

The foregoing and additional objects will become more fully apparent from the following description and the accompanying drawings.

SUMMARY OF THE INVENTION

The invention relates to a galvanic cell comprising a container having an open end and an inner disposed anode; a cathode within said container; a separator disposed between said anode and said cathode; an electrolyte disposed within said container; and a cover for said container; said container having a segment of its upper wall radially compressed against said cover providing a seal thereat and having the upper wall which extends beyond the seal turned over the top surface of the cover; and wherein the improvement is a grease compound disposed at the interface of the container and the cover forming the seal and wherein the cover has at least one recess in its top surface extended partially through the cover and at least partially disposed under the upper wall of the container which is turned over the cover so as to facilitate the venting of gases from within the cell at the interface of the cover and the turned over portion of the upper wall of the container.

As used herein, a recess shall mean a groove, channel, notch, cut-away or any other depression or opening in the surface of the cover which extends partially through the cover. A recess shall also be defined as the depression formed between adjacent ribs or bosses which project from the surface of the cover.

The invention also relates to a galvanic cell comprising a container having an open end and an inner disposed anode; a cathode within said container; a separator disposed between said anode and said cathode; an electrolyte disposed within said container; and a cover for said container, said container having a segment of its upper wall radially compressed against said cover providing a seal thereat and having the upper wall which extends beyond the seal turned over the top surface of the cover; and wherein the improvement is a grease compound disposed at the interface of the container and cover forming the seal and wherein the upper wall of the container which is turned over the cover has at least one notch so as to facilitate the venting of gases from within the cell at the interface of the cover and the turned over portion of the upper wall of the container.

As used herein a notch in the turned over portion of the container wall shall also mean a hole in said turned over wall portion.

As used herein, a grease compound is intended to mean a noncurable, yieldable composition comprising such as silicone polymer, silicone-containing polymeric compounds, petroleum-based jellies or grease, and the like.

In conventional type galvanic cells, the upper wall of the container is sealed to the cover of the cell using a radial and/or crimped sealing technique. In Leclanche, zinc chloride or other galvanic cells, there is usually a tendency to have gas buildup within the cell during storage and/or use. As stated above, in designing a cell with a low pressure venting system, although the gas will have a means for venting to the atmosphere, there is a tendency that air from the atmosphere may possibly leak into the cell, thus causing corrosion of the anode. In addition, in low pressure venting systems, there is also a tendency for the electrolyte to creep or leak from the cell which could cause damage to the instrument or device in which the cell is incorporated. To provide an improved seal for the cells, it has been found that an application of grease, such as silicone grease, can be applied to the interface of the upper portion of the inner container wall and the cover. This effectively seals the cells against low pressure leakage of electrolyte while simultaneously preventing premature drying out of the liquid components of the cell.

It has been found that when the upper extremity of the container wall is turned over and onto the cover of the cell using conventional techniques, the seal obtained through the use of the grease in combination with conventional radial and/or crimping sealing techniques is very effective. However, with the build up of gas pressure within the cell, the container wall expands to relax the radial seal and the cover is urged axially upward thereby securing and sealing the cover of the cell to the upper turned over portion of the container wall, thus blocking any path for the gas to escape. As a result, with the increase of pressure buildup within the cell, the seal becomes more effective against gas leakage. Although this may sound desirable, it has the effect that under abuse conditions, such as charging or high temperature environment, the gas pressure could continue to build up until it reaches a level where the cover may push out of the cell. This abusive use of the cell could damage the device in which the cell is used. To prevent the possibility of such damage, the present invention is directed to a relief means disposed at the interface of the cover and the upper turned over portion of the container wall, said relief means comprising either providing a recess in the top surface of the cover disposed under the turned over portion of the upper wall of the container or providing a notch in the upper wall of the container which is turned over the cover. As a result of this venting means, any excessive and high build up of pressure from within the cell escaping past the radial seal will vent at the interface of the cover and the turned over portion of the upper container wall. Thus using the teachings of this invention, galvanic cells can be provided with an economical and reliable sealing and venting means without the addition of any new component part.

As used herein, a recess in the top surface of the cover can be accomplished by providing a hole, notch or groove in the cover or by providing ribs, bosses, or the like which are disposed such that when the upper container wall is turned over and onto the cover, the container wall will rest on or be embedded in the ribs, bosses, or the like, thus providing a groove or the like between the adjacent ribs, bosses, or the like.

The present invention will become more apparent from the following description thereof when considered together with the accompanying drawing which is set forth as being exemplary of the embodiments of the present invention and is not intended in any way to be limitative thereof and wherein.

Figure 1:
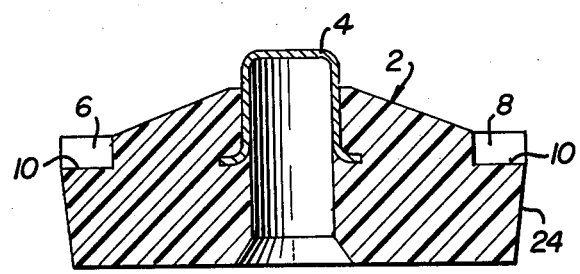
FIG. 1 is a sectional elevation taken through a cover for use in this invention.
Figure 2:
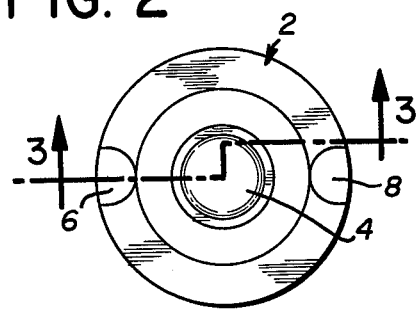
FIG. 2 is a plan view of the cover shown in FIG. 1.

Referring in detail to FIG. 1, there is shown a closure or cover 2 molded with an electrode terminal cap 4 at its center. The cover 2 should be a rigid structure and would usually be made of plastic. As shown in FIGS. 1 and 2, the cover 2 has semicircular type recesses 6 and 8 disposed in the top surface of cover 2 and extended outward and including the peripheral edge. The depth of recesses 6 and 8 is somewhat variable but must be sufficient such that when the top wall of a cell's container is turned or spun over the cover, the edge will not contact the lower surface 10. This is necessary to insure that a venting path will be maintained in the cell for the venting of gas from within the cell. Preferably, the spacing between the edge of the cell's container which is turned over the cover 2 and the lower surface 10 should be about 0.005 inch (0.013 cm) and about 0.030 inch (0.076 cm). If the recess was to be extended completely through the cover to form an opening therein, then electrolyte or moisture could escape and air could enter. Both of these conditions, as discussed above will shorten or even destroy the usefulness of the cell.

Figure 3:
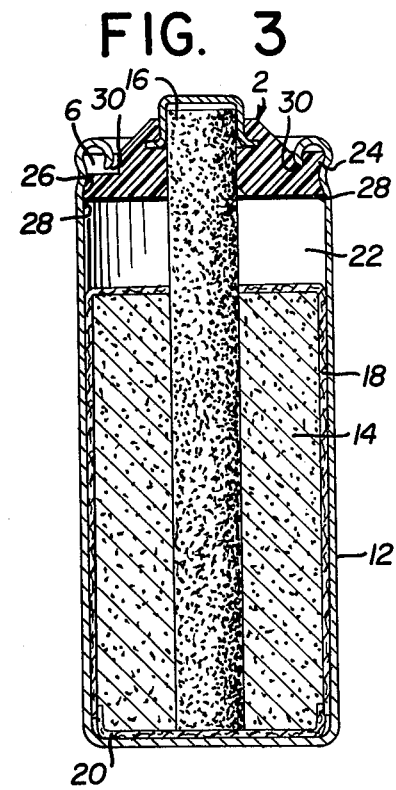
FIG. 3 is a sectional elevation of the cover of FIG. 1 taken through line 3—3 of FIG. 12 and shown assembled in a galvanic cell.

The cover 2 shown in FIGS. 1 and 2, through line 3—3 of FIG. 2, is shown in FIG. 3 assembled in a partially assembled typical dry cell including a cylindrical container 12 which is made of an electrochemically consumable metal such as zinc and which serves as the anode for the cell. The cell container 12 includes therein a cathode depolarizer mix cake 14 containing, for example, manganese dioxide, a conductive material such as carbon black and an electrolyte. The cathode depolarizer mix cake 14 could be molded around a central cathode collector rod 16 or the cathode depolarizer mix 14 could be fed into container 12 as a wet mix containing virtually all of the cell's electrolyte and then the cathode collector rod 16 forced down into the center of the depolarizer mix 14. The cathode collector rod 16 could be a carbon rod impregnated with a wax or an organic resin to render it both liquid and gas impermeable. Whether the depolarizer mix is molded into a bobbin type structure in a separate operation prior to cell assembly or fed directly into the container 12 and packed therein, the cathode collector rod 16 is inserted into the depolarizer mix 14 such that its end would protrude through the open end of the container 12. A separator 18 surrounds the cathode depolarizer mix 14 and separates it from the inner side wall of the container 12 while the bottom cup separator 20 separates the depolarizer mix 14 from the bottom inner surface of the container 12. The separator may be a thin film separator, e.g., a thin bibulous paper coated with a paste. The top of the separator 18 is shown folded down on the depolarizer mix 14 thereby leaving the usual air space 22 to accommodate any liquid spew that may be formed on discharge of the cell.

A thin film of grease is applied to the cover side wall 24 and/or the inner upper wall 26 of container 12 prior to assembling the cover 2 into the cell. As shown in FIG. 3, after the upper portion of container 12 is crimped and radially squeezed into the cover 2, a fully assembled sealed cell is produced, but without a jacket or label. A bead of grease 128 is usually formed adjacent the bottom of the cover and inner wall of container 12. The upper extremity of the wall of container 12 is curled over the cover 2 and usually the edge 30 is embedded into the top surface of cover 2. As shown in FIG. 3, recess 6 in cover 2 is disposed below the turned over portion of the container wall leaving an opening therebetween from which gas can escape from within the cell. Without recesses 6 and 8, the complete edge of the container wall would contact the cover 2 and then if excessive gas buildup within the cell was to exert pressure against cover 2, the cover 2 would be urged axially upward thereby further securing and sealing the turned over portion of the container wall to the cover. Consequently, with the increase of gas pressure within the cell under abuse conditions, the seal would become more effective until the gas pressure reached a level sufficient to cause the cover to be physically ejected from the container 12. To eliminate this possibility, the recesses 6 and 8 provide passages at the interface of the cover and the turned over segment of the container wall through which high pressure gas within the cell can escape or vent.

Figure 5:
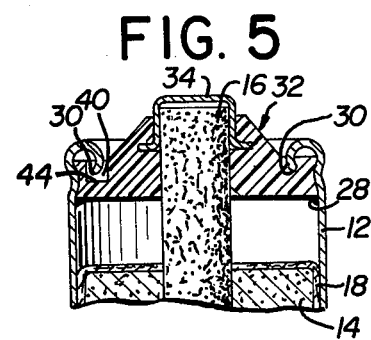
FIG. 5 is a sectional elevation taken through line 5—5 of FIG. 4 showing the cover assembled in the top portion of a galvanic cell.
Figure 4:
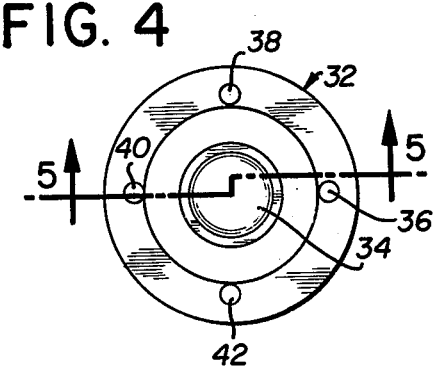
FIG. 4 is a plan view of another embodiment of a cover for use in this invention.

FIGS. 4 and 5 show another embodiment of a cover 32 having a center terminal 34 and four spaced apart circular recesses 36, 38, 40 and 42. As shown in FIG. 5, which is a view taken through line 5—5 of FIG. 4, the cover 32 is assembled in a cell having the same components and identified with the same reference numbers as the cell in FIG. 3. Specifically, FIG. 5 shows circular recess 40 disposed under the turned over portion of the wall of container 12 with its edge 30 spaced from the lower surface 44 of said recess 40. As is apparent from FIG. 5, recess 40 along with recesses 36, 38 and 42 will provide passages at the interface of cover 32 and the turned over portion of container 12 through which gas from within the cell can vent.

Figure 7:
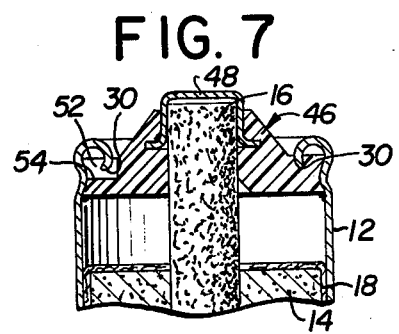
FIG. 7 is a sectional elevation taken through line 7—7 of FIG. 6 showing the cover assembled in a top portion of a galvanic cell.
Figure 6:
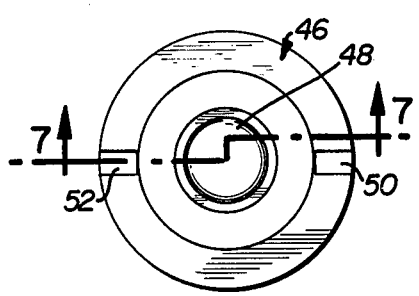
FIG. 6 is a plan view of another embodiment of a cover for use in this invention.

FIGS. 6 and 7 show another embodiment of a cover 46 having a center terminal 48 and two spaced apart rectangular recesses 50 and 52 which extend to the peripheral edge of the cover. As shown in FIG. 7, which is a view taken through line 7—7 of FIG. 6, the cover 46 is assembled in a cell having the same components and identified with the same reference numbers as the cell in FIG. 3. Specifically, FIG. 7 shows rectangular recess 52 disposed under the turned over portion of the wall of container 12 with its edge 30 spaced from the lower surface 54 of said recess 52. As is apparent from FIG. 7, recess 52 along with recess 50 will provide passages at the interface of cover 46 and the turned over portion of container 12 through which gas from within the cell can vent.

Figure 9:
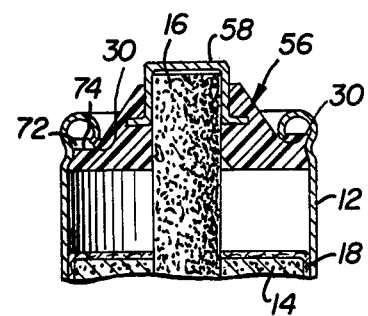
FIG. 9 is a sectional elevation taken through line 9—9 of FIG. 8 showing the cover assembled in a top portion of a galvanic cell.
Figure 8:
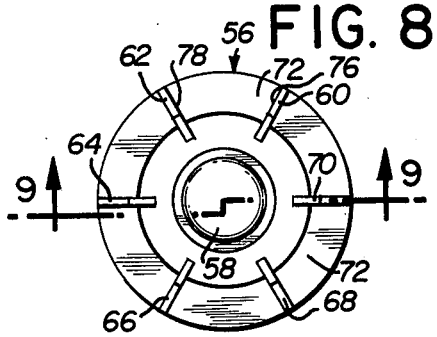
FIG. 8 is a plan view of another embodiment of a cover for use in this invention.

FIGS. 8 and 9 show another embodiment of a cover 56 having a center terminal 58 and six spaced apart, radially extended outward ribs 60, 62, 64, 66, 68 and 70. The ribs 60–70 extend about 0.02 inch (0.05 cm) above the surface 72 of cover 56 such that two adjacent ribs, for example, 60 and 62, will provide a recess 74 (FIG. 9) formed by surface 72 and the side walls 76 and 78 of ribs 60 and 62, respectively. As shown in FIG. 9, which is a view taken along line 9—9 of FIG. 8, the cover 56 is assembled in a cell having the same components and identified with the same reference numbers as the cell in FIG. 3. Specifically, FIG. 9 shows recess 74 disposed under the turned over portion of the wall of container 12 with its edge 30 spaced from the lower surface 72 of said recess 74. As is apparent from FIG. 9, recess 74 along with the other recesses defined between adjacent ribs 60–70 will provide passages at the interface of cover 56 and the turned over portion of container 12 through which gas from within the cell can vent. It should be evident from FIGS. 1 to 9 that the recess can be defined by any geometric configuration as long as it functions as a gas vent passage between the cover and the turned over portion of the container wall. By proper selection of the dimensions of the recess, the recess can serve as a vent passage from the cell and the thus prevent damage to the cell as discussed above.

Figure 11:
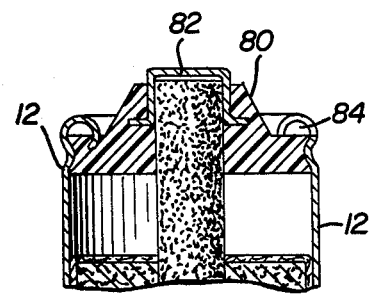
FIG. 11 is a sectional elevation taken through lines 11—11 of FIG. 10 showing the top portion of the assembled galvanic cell.
Figure 10:
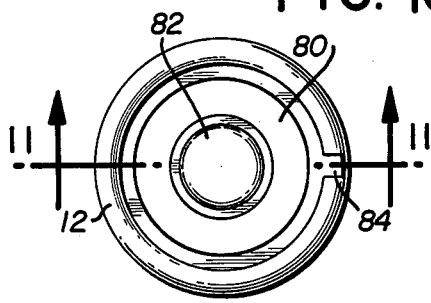
FIG. 10 is a plan view of an assembled galvanic cell.

FIG. 10 shows a plan view of a partially assembled galvanic dry cell including a cover 80 having a center terminal 82 and the upper wall of container 12 curled over said cover 80. This cell is typical of the conventional galvanic dry cells except that a portion of the upper curled over wall of container 12 is notched to provide an opening 84. As shown in FIG. 11, which is a view taken through line 11—11 of FIG. 10, the upper curled over wall of container 12 is cut to provide an opening 84 at the interface of the cover and the curled over portion of the container wall. The elimination of a portion of the curled rim of container 12 will provide an opening 84 through which gas from which the cell can vent.

As is evident from the drawing, the present invention provides gas relief means at the interface of the cover and the turned over or curled over portion of the upper container wall without affecting the seal at the interface of the side wall of the cover and the upstanding inner wall of the container obtained through conventional radial and/or crimping techniques.

EXAMPLE 1

Several lots of "AA" size cells, 15 cells per lot, 0.526 inch (1.34 cm) outside diameter and 1.910 inches (4.78 cm) long, were constructed as generally shown in FIGS. 1 through 3. The anode of each cell consisted of a zinc cylindrical container having therein a cathode depolarizer mix composed of manganese dioxide, carbon black and an electrolyte comprising aqueous zinc chloride or a conventional aqueous mixture of zinc chloride and ammonium chloride. A thin, bibulous separator paper surrounded the cathode depolarizer mix thereby separating the mix from the inner wall of the zinc container. A carbon collector rod having a diameter of 0.161 inch (0.41 cm) was disposed within the center of the mix with its top portion projecting above the mix. A polystyrene cover having an outside diameter of 0.495 inch (1.257 cm) and molded with a terminal cap as shown in FIG. 1 was forced into the zinc container. The top of the zinc container was then locked in engagement with the cover by the conventional crimping and necking technique. This provided a primary seal at the interface of the wall of the cover and the inner upstanding wall of the container. All but one lot of cells was given a thin layer of silicone grease at the primary seal interface, that is, the interface of the outer wall of the cover and the inner wall of the container. In several of the cell lots, the cover was given two spaced-apart, semicircular type recesses as shown in FIGS. 1 and 2, each of said recesses measuring 0.06 inch (0.15 cm) in the radial dimension, 0.09 inch (0.23 cm) in the arc dimension, and extending for a depth as shown in Table I below. The cell lots were then stored at 71° C. and any instances in which the seal failed thereby damaging the cell were observed at one and two weeks. Seal failure is evidenced by observable lifting of the turned over portion of the container. Normal venting (without seal failure) will pass gas between the cover and the outer container wall without causing observable lifting of the turned over portion of the container. The data so observed are recorded in Table I.

TABLE I

| Lot No. | Closure | Seal Failures - Total After | |
|---|---|---|---|
| | | 1 Week | 2 Weeks |
| 1 * | Conventional (no grease) | 2 | 11 |
| 2 * | Conventional (with grease) | 6 | 13 |
| 3 * | Recess Depth (0.1 cm) (0.04 inch) | 0 | 2 |
| 4 * | Recess Depth (0.08 cm) (0.03 inch) | 0 | 0 |
| 5 * | Recess Depth (0.05 cm) (0.020 inch) | 1 | 8 |
| 6 ** | Recess Depth (0.1 cm) (0.040 inch) | 0 | 1 |
| 7 ** | Recess Depth (0.08 cm) (0.030 inch) | 1 | 2 |
| 8 ** | Recess Depth (0.05 cm) (0.020 inch) | 11 | 15 |
| 9 *** | Recess Depth (0.1 cm) (0.040 inch) | 0 | 8 |
| 10 *** | Recess Depth (0.08 cm) (0.030 inch) | 1 | 8 |
| 11 *** | Recess Depth (0.05 cm) (0.030 inch) | 13 | 14 |

All cells have grease except Lot No 1.
*electrolyte-Leclanche
** electrolyte-zinc chloride + African ore depolarizer
*** electrolyte-zinc chloride + electrolytic MnO₂ depolarizer As is apparent from the data in Table I, the present invention whereby adequate size venting passages are provided at the interface of the cover and the curled over portion of the container while not affecting the primary seal will effectively eliminate the seal failure associated with identical type cells but without the venting passages. The data in Table I also show that in these zinc-chloride cells gas buildup was more severe, and thus to insure against possible seal failure, the recesses should extend further into the cover than the same size recesses for use with the Leclanche cells. For example, when the semicircular recesses were extended 0.04 inch (0.1 cm) into the cover, none of the seals of the cells failed in the zinc-chloride cell lots during the first week.

EXAMPLE 2

Several lots of "AA" size cells were constructed as shown in FIGS. 1 to 3 using the semicircular type recesses as described in Example 1. The components of the cells were essentially the same as used in Example 1 and all had a layer of silicone grease at the interface of the primary seal.

To simulate cell abuse each cell was given a 150 mA charge for 24 hours, and then for the next 24 hour period and 7 day period the cells were observed to see if any seals had failed. The results of this test are shown in Table II.

TABLE II

| No. of Cells | Closure | Seal Failure | | | |
|---|---|---|---|---|---|
| | | 24 hr charge | 24 hr rest | 7 day rest | Total |
| 100 * | Conventional | 12 | 13 | 6 | 31 |
| 100 * | Recess Depth (0.1 cm) (0.04 inch) | 0 | 0 | 0 | 0 |
| 100 * | Recess Depth (0.08 cm) (0.03 inch) | 0 | 0 | 0 | 0 |
| 100 * | Recess Depth (0.05 cm) (0.02 inch) | 0 | 0 | 0 | 0 |
| 80 ** | Recess Depth (0.1 cm) (0.04 inch) | 0 | 0 | 0 | 0 |
| 40 ** | Recess Depth (0.08 cm) (0.03 inch) | 0 | 0 | 0 | 0 |
| 40 ** | Recess Depth (0.05 cm) (0.02 inch) | 0 | 0 | 0 | 0 |
| 40 *** | Recess Depth (0.1 cm) (0.04 inch) | 0 | 0 | 0 | 0 |
| 40 *** | Recess Depth (0.08 cm) (0.03 inch) | 0 | 0 | 0 | 0 |
| 40 *** | Recess Depth (0.05 cm) (0.02 inch) | 0 | 0 | 0 | 0 |

* electrolyte-Leclanche
** elctrolyte-zinc chloride + African ore depolarizer
*** electrolyte-zinc chloride + electrolytic MnO₂ deopolarizer As is apparent from the data in Table II, the present invention will provide excellent protection against abuse charging of galvanic dry cells.

EXAMPLE 3

Several lots of Leclanche "AA" size cells were constructed using the components, including the layer of silicone grease, as described in conjunction with Example 1 for the Leclanche cells with the exception that the cover was modified to the extent of having evenly spaced-apart circular recesses as disclosed in FIG. 4 or evenly spaced-apart rectangular recesses as disclosed in FIG. 6. Each cell was given a 150 mA abuse charge for 24 hours, and then for the next 24 hour period and 7 day period the cells were observed to see if any seal had failed. The results of the test are shown in Table III.

TABLE III

| No. of Cells | Closure | Seal Failure | | | |
|---|---|---|---|---|---|
| | | 24 hr charge | 24 hr rest | 7 day rest | Total |
| 20 | Conventional | 3 | 3 | 3 | 9 |
| 10 | * 4 recesses | 1 | 0 | 0 | 1 |
| 20 | * 8 recesses | 0 | 0 | 0 | 0 |
| 10 | ** 4 recesses | 0 | 0 | 0 | 0 |
| 10 | ** 4 recesses *** | 0 | 0 | 0 | 0 |
| 10 | ** 6 recesses | 0 | 0 | 0 | 0 |
| 10 | ** 6 recesses *** | 0 | 0 | 0 | 0 |

* circular recesses measured 1/16 inch (0.16 cm) diameter by 0.040 inch (0.01 cm) depth
** rectangular recesses measured 0.03 inch (0.08 cm) by 0.060 inch (0.15 cm) by 0.020 inch (0.05 cm) depth
*** the top edge of the container wall was bent flat over the cover As is further apparent from the data in Table III, the present invention will provide excellent protection against abuse charging of galvanic dry cells.

It can be concluded that since the cells of this invention can effectively withstand abuse charging and high temperature storage without seal failure, the invention will provide an excellent sealing and venting means for galvanic dry cells.

It is to be understood that other modifications and changes to the preferred embodiment of the invention herein shown and described can also be made without departing from the spirit and scope of the invention.

What is claimed is:

1. In a galvanic cell comprising a container having an open end and an inner disposed anode; a cathode within said container; a separator disposed between said anode and said cathode; an electrolyte disposed within said container; and a cover for said container, said container having a segment of its upper wall radially compressed against said cover providing a seal thereat and having the upper wall which extends beyond the seal turned over the top surface of the cover; the improvement wherein a grease compound is disposed at the interface of the container and the cover forming the seal and wherein the cover has at least one recess in its top surface extended partially through the cover and at least partially disposed under the upper wall of the container which is turned over the cover so as to facilitate the venting of gases from within the cell at the interface of the cover and the turned over portion of the upper wall of the container.

2. In the galvanic cell of claim 1 wherein the grease compound comprises a silicone polymer.

3. In the galvanic cell of claim 1 wherein the at least one recess in the top surface of the cover is a substantially semicircular recess which extends to the peripheral edge of the cover.

4. In the galvanic cell of claim 1 wherein the at least one recess in the top surface of the cover is a substantially circular recess.

5. In the galvanic cell of claim 1 wherein the at least one recess in the top surface of the cover is a substantially rectangular recess.

6. In the galvanic cell of claim 1 wherein the at least one recess in the top surface of the cover is defined by adjacent ribs disposed on the top surface of the cover.

7. In the galvanic cell of claim 1 wherein the at least one recess in the top surface of the cover is defined by adjacent upstanding bosses disposed on the top surface of the cover.

8. In a galvanic cell comprising a container having an open end and an inner disposed anode; a cathode within said container; a separator disposed between said anode and said cathode; an electrolyte disposed within said container; and a cover for said container, said container having a segment of its upper wall radially compressed against said cover providing a seal thereat and having the upper wall which extends beyond the seal turned over the top surface of the cover; the improvement wherein a grease compound is disposed at the interface of the container and cover forming the seal and wherein the upper wall of the container which is turned over the cover has at least one notch so as to facilitate the venting of gases from within the cell at the interface of the cover and the turned over portion of the upper wall of the container.

9. In the galvanic cell of claim 8 wherein the grease compound comprises a silicone polymer.

10. In the galvanic cell of claim 8 wherein the cover has at least one recess in its top surface extended partially through the cover and at least partially disposed under the upper wall of the container which is turned over the cover so as to further facilitate the venting of gases from within the cell at the interface of the cover and the turned over portion of the upper wall of the container.

11. In the galvanic cell of claim 10 wherein the at least one recess in the top surface of the cover is a substantially semicircular recess which extends to the peripheral edge of the cover.

12. In the galvanic cell of claim 10 wherein the at least one recess in the top surface of the cover is a substantially circular recess.

13. In the galvanic cell of claim 10 wherein the at least one recess in the top surface of the cover is a substantially rectangular recess.

14. In the galvanic cell of claim 10 wherein the at least one recess in the top surface of the cover is defined by adjacent ribs disposed on the top surface of the cover.

15. In the galvanic cell of claim 10 wherein the at least one recess in the top surface of the cover is defined by adjacent upstanding bosses disposed on the top surface of the cover.

* * * * *

UNITED STATES PATENT AND TRADEMARK OFFICE
Certificate

Patent No. 4,079,172            Patented March 14, 1978

Thomas Renwick Potts and Norris Holland Drum

Application having been made by Thomas Renwick Potts and Norris Holland Drum, the inventors named in the patent above identified, and Union Carbide Corporation, New York, New York, a corporation of New York, the assignee, for the issuance of a certificate under the provisions of Title 35, Section 256, of the United States Code, adding the name of Lewis Frederick Urry as a joint inventor, and a showing and proof of facts satisfying the requirements of the said section having been submitted, it is this 18th day of March 1980 certified that the name of the said Lewis Frederick Urry is hereby added to the said patent as a joint inventor with the said Thomas Renwick Potts and Norris Holland Drum.

FRED W. SHERLING,
*Associate Solicitor.*